United States Patent [19]

McCoy et al.

[11] 3,920,540

[45] Nov. 18, 1975

[54] METHOD OF TREATING OILS TO REMOVE CONTAMINANTS OF SULFUR NITROGEN AND COLOR BODIES

[75] Inventors: Frederic C. McCoy, Beacon; John T. Brandenburg, Hopewell Junction, both of N.Y.

[73] Assignee: Texaco Inc., New York, N.Y.

[22] Filed: Apr. 3, 1973

[21] Appl. No.: 347,532

[52] U.S. Cl. ............... 208/248; 208/254; 208/297; 208/299; 208/213; 208/261; 23/252 A
[51] Int. Cl.².......................................... C10G 29/04
[58] Field of Search ........... 208/182, 253, 254, 260, 208/257, 261, 297, 299, 248, 250, 298, 303, 306, 213, 300; 260/677 A

[56] References Cited
UNITED STATES PATENTS

| | | | |
|---|---|---|---|
| 2,395,931 | 3/1946 | Lande................................. | 208/297 |
| 2,914,458 | 11/1959 | Harper................................. | 208/253 |
| 3,231,520 | 1/1966 | Leak et al........................... | 252/463 |

FOREIGN PATENTS OR APPLICATIONS

| | | | |
|---|---|---|---|
| 462,634 | 1/1950 | Canada............................... | 208/182 |
| 611,775 | 1/1961 | Canada............................... | 208/299 |

OTHER PUBLICATIONS

Journal of Petroleum Technologists, Vol. 8, Jan. 1922.

*Primary Examiner*—Delbert E. Gantz
*Assistant Examiner*—Juanita M. Nelson
*Attorney, Agent, or Firm*—T. H. Whaley; C. G. Ries; Carl G. Seutter

[57] ABSTRACT

Treatment of oils with alumina on a metal support permits increase in viscosity index and decrease in color, basic nitrogen, and sulfur content.

26 Claims, No Drawings

METHOD OF TREATING OILS TO REMOVE CONTAMINANTS OF SULFUR NITROGEN AND COLOR BODIES

This invention relates to a method of treating oils. More particularly it relates to the treatment of oils to remove undesirable components including color bodies, basic nitrogen compounds, and sulfur, and to improve the properties (including viscosity index) of the oils.

BACKGROUND OF THE INVENTION

As is well known to those skilled in the art, various oils such as hydrocarbon oils may be subjected to a wide variety of processing techniques to improve properties. The properties of the charge oil which are to be improved may include those based upon the content of a particular component such as paraffins, naphthenes, aromatics, high boiling fractions, or low boiling fractions. Commonlly the hydrocarbon may be treated to improve its viscosity index or color (as in the case of lubricating oils), its sulfur content or its content of basic nitrogen nitrogen compounds (as in the case of fuel oils), etc.

While treatment of hydrocarbons with alumina has been practiced for many years in petroleum technology, such treatment has commonly employed granular alumina of varying particle size in fixed beds. Alumina in this form is subject to attrition and fragmentation either during use or during regeneration. This frequently results in compaction and an undesirable loss in permeability of the treating medium. Furthermore, uniform temperature control throughout the bed is difficult because of the low heat conductivity of the alumina.

It is an object of this invention to provide a novel method of treating oils with alumina. Other objects will be apparent to those skilled in the art.

STATEMENT OF THE INVENTION

In accordance with certain of its aspects, the novel method of this invention for treating a charge oil containing undesirable components may comprise passing said charge oil into contact with a thin film of alumina on a metallic support whereby undesirable components of said charge oil are adsorbed by said alumina and an improved product oil is formed containing decreased amounts of undesirable components; and withdrawing said improved product oil containing decreased amounts of undesirable components.

DESCRIPTION OF THE INVENTION

The charge oils which may be treated by the process of this invention include oils which may be of animal, vegetable, or mineral origin. Typical of the animal oils may be tallow oil, sperm oil, menhaden oil, etc. Typical of the vegetable oils may be soy bean oil, corn oil, cottonseed oil, etc. The preferred charge may be a petroleum oil, and in the preferred embodiment, the charge oil may be a lubricating oil stock. Such charge oils may have been subjected to prior treatment including, depending upon the particular stock, vacuum distillation, deasphalting, solvent refining, hydrotreating, dewaxing, etc.

The hydrocarbons which may be treated by the process of this invention may be those which contain undesirable materials including color bodies, basic nitrogen, sulfur, etc. Typical of such hydrocarbons may be raw distillates, particularly naphthene base distillates, solvent extracts, and middle distillates which have become discolored in storage.

The preferred petroleum charge oil which may be treated by the process of this invention may include a lubricating oil stock — typically a lubricating oil stock which has not been subjected to any previous refining process except distillation. Since the oils are preferably diluted with a low-boiling solvent before treatment, it is a feature of the process of this invention that it may be used to treat oils having a wide range of properties such as viscosity, pour point, etc.

In practice of the method of this invention, the charge oil may be contacted with a composition containing a film of alumina ($Al_2O_3$) on a metallic support. The composition may be that disclosed or claimed in U.S. Pat. No. 3,231,520 issued Jan. 25, 1966 to Texaco Inc. as assignee of Robert J. Leak and Harry J. Le Bleu.

Typically the composition may be a thin layer of alumina on a metal in various forms including pellets, chips, random pieces, etc. but more preferably on fibrous metal (e.g. steel wool or wire mesh) support. The alumina film on the metallic support may be formed thereon by various techniques including (when the metallic substrate contains aluminum metal) oxidation of the surface of the base metal of the metallic support. Preferably however the alumina is deposited on the substrate by deposition from a solution in which aluminum hydroxide is formed.

The composition may be in the form of finely divided material — preferably steel wool which is chopped into short (typically 0.1–2cm) lengths prior to deposition thereon of the alumina. It may be in the form of a large essentially continuous mass wherein all portions of the composition are continuous and preferably in electrical contact with each other.

In one embodiment, the composition may be that obtained by the first paragraph of Example I of U.S. Pat. No. 3,231,520. In another embodiment, the composition may be that obtained by the first paragraph of Example VII of U.S. Pat. No. 3,231,520.

In a preferred embodiment, the composition may include a body of steel wool (packed into a cylindrical steel vessel to a density of typically 25 pcf) which is then coated with alumina. Alumina coating may be effected by passing through the body of steel wool in the column, for 24 hours at 180°F, a solution obtained by dissolving 200 parts of aluminum pills in a solution containing 300 parts of sodium hydroxide and 5,000 parts of water. The body of steel wool, now bearing a coating of alumina is washed with distilled water and then dried gradually. Drying is carried out at 300°F for 16 hours, at 500°F for 2 hours, and then at 1,000°F for 2 hours.

The final composition contains alumina in amount of 5 percent up to 60–80 percent, say 70 percent by weight (of total weight of alumina plus support). The alumina is preferably in the form of a film of gamma alumina having a thickness of 4–150, say 4–30 mils, typically about 20 mils.

This composition may preferably be used in a fixed bed when prepared as indicated. When prepared in particulate form e.g. alumina-on-chopped steel wool, it may be used in a fluid bed or in a gravity packed bed.

It is a feature of the process of this invention that the use of the preferred composition containing a film of alumina on a metallic support permits temperature control of the bed in a manner not heretofore achieved in comparable processes wherein oils are treated with alumina. A typical alumina-on-steel wool composition, whether the latter is chopped to form metal fibres or is in continuous form, may readily be heatd to desired temperature by inductive heating. When the metal support is continuous, the bed can readily be heated by resistive heating.

The charge hydrocarbon may preferably be admitted in liquid phase, to a fixed bed of the alumina on metal support — and passed downwardly through the bed. Typically the liquid charge may be allowed to trickle downwardly through the bed.

When the charge hydrocarbon has a viscosity above about 50–60 SUS (i.e. about 7–10 cs) at 100°F, it is preferred to dilute it with 0.5–3 volumes per volume of inert diluent-liquid, preferably a low boiling paraffinic hydrocarbon such as a pentane, a hexane, or a heptane. Use of a diluted charge mixture permits ready passage of the liquid through the bed.

Preferred conditions within the bed may be as noted in the following Table:

TABLE

| Condition | Broad | Preferred | Typical |
| --- | --- | --- | --- |
| Temperature °F | 50–300 | 70–150 | 100 |
| Pressure psig | 0–100 | 10–20 | 0.0 |

The liquid volume hourly space velocity may depend on the permeability of the bed and the nature of the charge stock being treated. The permeability may be a function of the size of the metal support and the degree of compaction of the metal support (e.g. fibres) prior to coating with alumina. Typical values of the volume hourly space velocity VHSV may be 0.5–3.

The effluent from the contacting operation is withdrawn and collected. When the effluent contains solvent-diluent, it is separated as by flashing or distillation to yield a solvent-free product. Solvent may be recycled.

As the charge liquid percolates through the bed, it may be found that the liquid is freed of undesirable components. It will be apparent to those skilled in the art that the specific improvements obtained may be dependent on the make-up of the charge. Commonly however in the case of a typical lubricating oil stock, it may unexpectedly be possible to improve one or more properties including the viscosity index, the color, the basic $N_2$, and the sulfur content.

Thus it may be possible to increase the viscosity index of a sample from an initial value of 15 to a final value of 27 and to decrease the ASTM color (ATM Test No. D-1500) from about 2.5 to about 1.5, the basic nitrogen from 140 ppm to 58 ppm, and the sulfur content from 0.23 to 0.18 percent.

Typically treating of charge stocks may be at conditions sufficient to maintain the stock in liquid condition. Commonly temperature of operation may be ambient temperature of say 50°F up to 250°F–300°F at pressure of preferably 0–200 psig, say 0 psig. It is a feature of this invention that the temperature of operation may be controlled at desired level by inductively or resistively heating the alumina-on-metal support during operation.

When it is determined that the bed is depleted, as may be ascertained by continuously monitoring the effluent product, the column may be drained and then regenerated. Preferably regeneration is effected by passing 1–10 volumes, say 3 volumes (per total volume of bed) of solvent at 60°–150°F, say 100°F through the bed.

The regenerating solvent may be one in which the charge oil is readily soluble, such as benzene, toluene, etc. It may be a ketone such as acetone, methyl ethyl ketone, etc. or an ether such as tetrahydrofuran. In the preferred embodiment, the solvent used for regeneration may be acetone.

Regeneration in this embodiment may be carried out at the following conditions:

TABLE

| Condition | Broad | Preferred | Typical |
| --- | --- | --- | --- |
| Temp. °F. | 70–250 | 80–180 | 130 |
| Pressure psig | 0–50 | 0–20 | 0 |
| VHSV | 5–100 | 40–50 | 45 |

At the end of recovery or regeneration as determined by monitoring the effluent for dissolved material, the bed may be dried by passing therethrough gas, preferably air, at 70°F–200°F, say 150°F until essentially no solvent is detected in the off-gas.

In an alternative and preferred embodiment, regeneration may be effected by removing the entrained oil and solvent and heating the bed to pyrolysis-oxidation temperature-typically 450°F–1500°F, say 1,000°F. This may readily be effected by inductive or resistive heating of the alumina-on-metallic-support; and it may be found that little or no deterioration of the bed occurs during regeneration.

DESCRIPTION OF PREFERRED EMBODIMENT

Practice of the method of this invention may be apparent to those skilled in the art from inspection of the following wherein, as elsewhere in this description, all parts are parts by weight unless otherwise noted.

EXAMPLE I–V

In this series of examples, a sodium aluminate solution is prepared by dissolviing 300 parts of sodium hydroxide in 5,000 parts of water and then adding 200 parts of aluminum pills which are allowed to dissolve. Coarse, 11 mil, stainless steel wool pads (total weight 60 parts) are immersed in the solution and maintained therein at 180°F for 8 hours.

At that time, the steel wool, bearing a coating of alumina, is washed with water and then with distilled water. Gradual drying is carried out at 300°F for 16 hours, then at 500°F for 2 hours, and then at 1,000°F for 2 hours. At this time, the steel wool is found to bear a coating consisting essentially of gamma alumina in amount of 80 percent of the total weight of steel support plus alumina.

The alumina-bearing steel wool is packed into a cylindrical steel column (16 cm long × 4.5 cm i.d.) at a density of 1.3 g/cc. (based on total volume).

In this Example, the charge liquid treated by the method of this invention is a 200 Pale Stock, a naphthenic distillate, having the following properties:

TABLE

| Property | Value |
| --- | --- |
| Vis., Kinematic | |
| at 100°F. cs. | 43.0 |
| at 200°F. cs. | 5.23 |
| VI | 15 |
| Color ASTM | 2.5 |
| Basic $N_2$ ppm | 140 |

TABLE-continued

| Property | Value |
|---|---|
| Sulfur % | 0.23 |

In Example 1, 50g of this charge hydrocarbon is diluted to 100 ml. with pentane. In Examples 2–5, 100g of this charge hydrocarbon is diluted to 200 ml. with pentane. The charge liquid is passed through the column; and the properties are determined. Thereafter, the remainder of the liquid is withdrawn from the column by means of vacuum, the column is then washed four times with 50 ml portions of acetone and thereafter twice with 50 ml of benzene. The acetone and benzene washings are combined and analyzed. The column is air-dried at 70°F, then further air-dried at 170°F.

The analyses of the charge hydrocarbon, the effluent (pentane-free basis) — in columns I$a$, II$a$, III$a$, IV$a$, and V$a$ — and the acetone soluble material (on an acetone-free basis) — in columns I$b$, II$b$, III$b$, IV$b$, and V$b$ — are reported as follows:

TABLE

| Property | Charge | Ia | Ib | IIa | IIb | IIIa | IIIb | IVa | IVb | Va | Vb |
|---|---|---|---|---|---|---|---|---|---|---|---|
| Viscosity, Kin. | | | | | | | | | | | |
| at 100°F cs. | 43.0 | 40.2 | | 42.8 | | 31.9 | | 38.6 | | 33.5 | |
| at 210°F cs. | 5.23 | 5.05 | | 5.14 | | 4.64 | | 5.00 | | 4.72 | |
| Viscosity Index | 15 | 27 | | 19 | | 44 | | 33 | | 39 | |
| Color ASTM | <2.5 | <1.5 | | <2 | | <2 | | <2 | | <2.5 | |
| Basic N$_2$ ppm | 140 | 58 | 206 | 110 | 224 | 113 | 227 | 108 | 246 | 115 | 193 |
| Sulfur % | 0.23 | 0.18 | | | | | | | | | |
| Fraction Oil Recovered (% of charge by wt) | — | 42.4 | 47.8 | 73.4 | 13.0 | 81.4 | 13.0 | 82.5 | 12.0 | 79.8 | 18.4 |

From the above table, it is apparent that the viscosity index of the charge oil may be increased from 15 to a value as high as 44 — almost three times as great. The color of the oil may desirably be decreased to 1.5 ASTM, the basic nitrogen desirably reduced to as low as 58 ppm and the sulfur content lowered from 0.23 down to 0.18 percent.

EXAMPLES VI–X

In this series of Examples, the column contained steel wool pads as follows:

Examples VI & X — 230g Al$_2$O$_3$ on 60g stainless steel (11 mil fibres) wool.

Examples VII & IX — 80g Al$_2$O$_3$ on 80 g stainless steel (6 mil fibres) wool packed in rolls.

Example VIII — 80g Al$_2$O$_3$ on 80 g stainless steel (6 mil fibres) wool packed lengthwise.

The charge in all cases is 200 Pale Stock diluted with pentane. In Example VI, 100g is diluted to 300 ml; in Examples VII–VIII, 100g is diluted to 200 ml; in Example IX, 200g is diluted to 400 ml; and in Example X, 100g is diluted to 200 ml.

Prior to the runs of Examples VII and X, the column is recovered (i.e. regenerated) with acetone and benzene as in Examples I–V. Prior to Example IX, the column is recovered by washing with 150 ml pentane, sucked dry, washed with 100 ml acetone, and then washed with 50 ml benzene. As before, the analyses set forth in the table include columns VI$a$, VII$a$, VIII$a$, IX$a$, and X$a$ showing properties of effluent on a pentane-free basis and columns VI$b$, VII$b$, VIII$b$, IX$b$, and X$b$ showing properties of the acetone extract (on an acetone-free basis).

TABLE

| Property | Charge | VIa | VIb | VIIa | VIIb | VIIIa | VIIIb | IXa | IXb | Xa | Xb |
|---|---|---|---|---|---|---|---|---|---|---|---|
| Viscosity, Kin | | | | | | | | | | | |
| at 100°F cs | 45.0 | 43.2 | | 42.7 | | 40.2 | | 37.4 | | 33.7 | |
| at 210°F cs | 5.23 | 5.18 | | 5.18 | | 5.04 | | 4.95 | | 4.63 | |
| Viscosity Index | 15 | 21 | | 25 | | 25 | | 36 | | 24 | |
| Color ASTM | 2.5 | <2 | | <2 | | <2.5 | | <2 | | <2 | |
| Basic N$_2$ ppm | 140 | 87 | 337 | 71 | 1600 | 71 | 2500 | 90 | 1550 | 84 | 226 |
| Fraction Oil Recovered (% of charge by wt) | — | 84 | 16 | 94.5 | 3.8 | 95.5 | 2.2 | 196 | 5 | 74 | 12 |

From the above table, it is apparent that it is possible to lower the ASTM color from 2.5 to less than 2 and to increase the viscosity index to as high as 36. It is also noted that the basic nitrogen content of the acetone-soluble stream recovered during regeneration of the column is as high as 2,500 ppm. This clearly indicates that these materials are adsorbed from the charge onto the alumina from which they may be desorbed by acetone.

EXAMPLE XI–XIII

In this series of Examples, the column and charge oils used were as follows:

Example XI — Column of Example IX was recovered and used to treat 100 g 200 Pale Stock diluted to 200 ml with pentane.

Example XII — Column of Example VIII was recovered and used to treat 67g of a solvent extract diluted to 200 ml with pentane. The oil is initially characterized by a kinematic viscosity at 100°F of 632.6cs, a viscosity at 210°F of 18.40, a viscosity index of −62, a basic nitrogen content of 600 ppm, and a sulfur content of 2.3 percent.

Example XIII — Column of Example XI was recovered and used to treat 100g of a dewaxed wax distillate 20 diluted to 200 ml. with pentane. The oil is initially characterized by an ASTM diluted color of 6.5–7.0 and a basic nitrogen content of 314 ppm.

The analysis of the effluent (pentane-free basis) is set forth in columns XI*a*, XII*a*, and XIII*a;* and the analyses of the acetone-soluble material (on an acetone-free basis) is set forth in columns XI*b*, XII*b*, and XIII*b*.

TABLE

| Property | XIa | XIb | XIIa | XIIb | XIIIa | XIIIb |
|---|---|---|---|---|---|---|
| Viscosity, Kin | | | | | | |
| at 100°F cs | 40 | | 421.7 | | | |
| at 210°F cs | 5.05 | | 15.65 | | | |
| Viscosity Index | 28 | | −36 | | | |
| Color ASTM | 2 | | | | 4(dil) | |
| Basic N$_2$ ppm | 80 | 920 | 455 | 1800 | 240 | 2000 |
| Sulfur % | | | | 2.6 | | |
| Fraction Oil Recovered (% of charge by wt.) | 90.9 | 5.6 | 89.0 | 10.6 | 94.0 | 5.0 |

From the above table, it is apparent that it is possible to effect improvement in the viscosity index, the ASTM color, and the basic nitrogen content by use of the method of this invention.

EXAMPLE XIV

In this Example, the column which had been used in Example X was fitted within an inductance coil made of 0.25 inch copper tubing wrapped in a cylinder three inches in diameter and three inches long. The coil was connected to a thermionic Induction Generator — Model 50 — and the output current (450 KC, 17.1 amp, 120 volts) was allowed to flow for 4 minutes through the coil. The temperature measured within the bed at a point 2 inches from the upper surface at the center of the bed was 460°F.

EXAMPLE XV

In this Example, the column of Example XIV is placed within the induction coil; and the voltage is adjusted to yield a temperature at about the center of the column of about 150°F. A solution containing 50 parts of 200 Pale Stock is diluted to 200 parts with n-heptane; and the mixture is passed through the column for 2 minutes. The column is then allowed to drain and washed with heptane and acetone. Inductive heating is again applied and the column is rapidly freed of solvent and regenerated for another run.

EXAMPLE XVI

The procedure of Example XV is repeated except that the desired heating to reach treating and regeneration temperature is attained by resistive heating — a 120v alternating electric current is passed through the metallic fibre substrate. Although this invention has been illustrated by reference to specific embodiments, it will be apparent to those skilled in the art that various changes and modificatins may be made which clearly fall within the scope of this invention.

We claim:

1. The method of increasing the viscosity index of a charge petroleum lubricating oil which comprises
   passing said charge petroleum oil at 50°F-300°F into contact with a film consisting essentially of alumina on a metallic steel wool support whereby an improved product oil is formed having an increased viscosity index; and
   withdrawing said improved product oil of increased viscosity index.

2. The method of desulfurizing a charge petroleum oil which comprises
   passing said charge petroleum oil at 50°F-300°F into contact with a film consisting essentially of alumina on a metallic steel wool support whereby an improved desulfurized product oil is formed; and
   withdrawing said improved desulfurized product oil.

3. The method of removing nitrogen components from a charge petroleum oil which comprises
   passing said charge petroleum oil at 50°F-300°F into contact with a film consisting essentially of alumina on a metallic support whereby an improved product petroleum oil is formed containing reduced amounts of nitrogen; and
   withdrawing said improved product petroleum oil containing reduced amounts of nitrogen.

4. The method of removing nitrogen components from a charge petroleum oil as claimed in claim 3 wherein said charge petroleum oil is a hydrocarbon fuel oil.

5. The method of removing nitrogen components from a charge petroleum oil as claimed in claim 3 wherein said support is a fibrous metal.

6. The method of removing nitrogen components from a charge petroleum oil as claimed in claim 3 wherein said support is steel wool.

7. the method of removing nitrogen components from a charge petroleum oil as claimed in claim 3 wherein said support includes short lengths of metal fibre.

8. The method of removing nitrogen components from a charge petroleum oil as claimed in claim 3 wherein said charge oil is diluted with inert diluent prior to contact with said alumina.

9. The method of removing nitrogen components from a charge petroleum oil as claimed in claim 3 wherein said metallic support and said alumina are maintained at temperature of 50°F–300°F by inductive heating.

10. The method of removing nitrogen components from a charge petroleum oil as claimed in claim 3 wherein, after said improved product petroleum oil containing reduced amounts of nitrogen is withdrawn, a regenerating solvent is passed into contact with said film of alumina thereby regenerating said film.

11. The method of removing nitrogen components from a charge petroleum oil as claimed in claim 3 wherein, after said improved product petroleum oil containing reduced amounts of nitrogen is withdrawn, said film of alumina on said metallic support is regenerated by heating said metallic support to regenerating temperature.

12. The method of removing nitrogen components from a charge petroleum hydrocarbon fuel oil which comprises
   passing said charge petroleum hydrocarbon fuel oil at 50°F–300°F into contact with a film consisting essentially of alumina on a support of steel wool whereby an improved product petroleum hydrocarbon fuel oil is formed containing reduced amounts of nitrogen; and withdrawing said improved product petroleum hydrocarbon fuel oil containing reduced amounts of nitrogen.

13. The method of decolorizing a petroleum oil which comprises passing a charge petroleum oil at 50°F–300°F into contact with a film consisting essentially of alumina on a metallic support whereby an improved product petroleum oil is formed containing reduced amounts of color bodies; and withdrawing said improved product petroleum oil containing reduced amounts of color bodies.

14. The method of decolorizing a petroleum oil as claimed in claim 13 wherein said charge petroleum oil is a hydrocarbon lubricating oil.

15. The method of decolorizing a petroleum oil as claimed in claim 13 wherein said support is a fibrous metal.

16. The method of decolorizing a petroleum oil as claimed in claim 13 wherein said support is steel wool.

17. The method of decolorizing a petroleum oil as claimed in claim 13 wherein said support includes short lengths of metal fibre.

18. The method of decolorizing a petroleum lubricating oil which comprises diluting said petroleum lubricating oil with an inert diluent;

passing said diluted charge petroleum lubricating oil at 50°F–300°F into contact with a film consisting essentially of alumina on a support of steel wool whereby a decolorized petroleum lubricating oil is formed containing reduced amounts of color bodies; and withdrawing said decolorized petroleum lubricating oil.

19. The method of increasing the viscosity index of a charge petroleum lubricating oil which comprises passing said charge petroleum oil at 50°F–300°F into contact with a film consisting essentially of alumina on a metallic support whereby an improved product oil is formed having an increasd viscosity index; and withdrawing said improved product oil of increased viscosity index.

20. The method of increasing the viscosity index of a charge petroleum lubricating oil as claimed in claim 19 wherein said support is a fibrous metal.

21. The method of increasing the viscosity index of a charge petroleum lubricating oil as claimed in claim 19 wherein said support is steel wool.

22. The method of increasing the viscosity index of a charge petroleum lubricating oil as claimed in claim 19 wherein said charge petroleum lubricating oil is diluted with inert diluent prior to contact with said alumina.

23. The method of desulfurizing a charge petroleum oil which comprises passing said charge petroleum oil at 50°F–300°F into contact with a film consisting essentially of alumina on a metallic support whereby an improved desulfurized product oil is formed; and withdrawing said improved desulfurized product oil.

24. The method of desulfurizing a charge petroleum oil as claimed in claim 23 wherein said charge petroleum oil is a fuel oil.

25. The method of desulfurizing a charge petroleum oil as claimed in claim 23 wherein said support is steel wool.

26. The method of desulfurizing a charge petroleum oil as claimed in claim 23 wherein said charge petroleum oil is diluted with inert diluent prior to contact with said alumina.

* * * * *